(12) United States Patent
Futa et al.

(10) Patent No.: US 7,979,731 B2
(45) Date of Patent: Jul. 12, 2011

(54) TIME AUTHENTICATION DEVICE, TIME AUTHENTICATION METHOD, COMPUTER PROGRAM, RECORDING MEDIUM, INTEGRATED CIRCUIT, AND TIME AUTHENTICATION SYSTEM

(75) Inventors: Yuichi Futa, Osaka (JP); Natsume Matsuzaki, Osaka (JP); Hiroki Yamauchi, Osaka (JP); Toshihisa Nakano, Osaka (JP)

(73) Assignee: Panasonic Corporation, Osaka (JP)

( * ) Notice: Subject to any disclaimer, the term of this patent is extended or adjusted under 35 U.S.C. 154(b) by 868 days.

(21) Appl. No.: 11/632,349

(22) PCT Filed: Jul. 13, 2005

(86) PCT No.: PCT/JP2005/012943
§ 371 (c)(1),
(2), (4) Date: Nov. 30, 2007

(87) PCT Pub. No.: WO2006/009041
PCT Pub. Date: Jan. 26, 2006

(65) Prior Publication Data
US 2008/0127279 A1    May 29, 2008

(30) Foreign Application Priority Data
Jul. 15, 2004   (JP) .................................. 2004-208522

(51) Int. Cl.
*G06F 1/00* (2006.01)
*G06F 7/04* (2006.01)
*G06F 17/30* (2006.01)
*H04L 9/32* (2006.01)
*H04N 7/18* (2006.01)
*H04N 7/16* (2006.01)

(52) U.S. Cl. .......... 713/500; 713/168; 713/178; 725/80; 726/26; 726/29

(58) Field of Classification Search .................. 713/168, 713/178, 500, 600; 726/26, 29; 725/80; 380/200
See application file for complete search history.

(56) References Cited

U.S. PATENT DOCUMENTS

| | | | | |
|---|---|---|---|---|
| 6,038,601 A | * | 3/2000 | Lambert et al. | 709/226 |
| 2002/0002542 A1 | * | 1/2002 | Ando et al. | 705/57 |

(Continued)

FOREIGN PATENT DOCUMENTS

| | | |
|---|---|---|
| JP | 06-028786 | 4/1994 |
| JP | 2000-242699 | 9/2000 |
| JP | 2001-84226 | 3/2001 |
| JP | 2003-150873 | 5/2003 |
| JP | 2004-030572 | 1/2004 |

*Primary Examiner* — Vincent T Tran
*Assistant Examiner* — Brandon Kinsey
(74) *Attorney, Agent, or Firm* — Wenderoth, Lind & Ponack, L.L.P.

(57) ABSTRACT

A time authentication device identifies clocks that show a time falling within the predetermined permissible range as compared with a time shown by the time authentication device. In a time authentication device embodied as a distribution device, a time-relation information storage unit stores a playback-device-time measured by a clock unit of a playback device, and also stores a distribution-device-time measured by a clock unit when the playback-device-time is acquired. The time authentication unit acquires from the playback device a target time measured by the clock unit, and also acquires an authentication time measured by the clock unit when the target time is received. The time authentication unit then calculates a first difference, a second difference, an authentication difference. If the authentication difference is smaller than or equal to a predetermined threshold, the time authentication unit judges that the clock unit of the playback device is valid.

20 Claims, 13 Drawing Sheets

U.S. PATENT DOCUMENTS

| | | | |
|---|---|---|---|
| 2003/0023853 A1* | 1/2003 | Wajs | 713/178 |
| 2004/0003291 A1 | 1/2004 | Futa et al. | |
| 2004/0015703 A1* | 1/2004 | Madison et al. | 713/185 |
| 2004/0030912 A1* | 2/2004 | Merkle et al. | 713/200 |
| 2004/0039912 A1* | 2/2004 | Borrowman et al. | 713/176 |
| 2004/0162063 A1* | 8/2004 | Quinones et al. | 455/419 |
| 2005/0234735 A1* | 10/2005 | Williams | 705/1 |
| 2005/0251603 A1* | 11/2005 | Ishii et al. | 710/110 |

* cited by examiner

FIG. 4

| | | | |
|---|---|---|---|
| | CONTENT STORAGE UNIT | | |
| CONTENT NAME /331 | EXPIRY INFORMATION /332 | CONTENT /333 | |
| CONTENT1.mpg | 2005/6/25 12:00:00 | CONTENT 1 | 321 |
| CONTENT2.mpg | 2005/6/30 12:30:00 | CONTENT 2 | 322 |
| ⋮ | ⋮ | ⋮ | |

| CONTENT NAME | EXPIRY INFORMATION |
|---|---|
| CONTENT1.mpg | 2005/6/25 12:00:00 |
| CONTENT2.mpg | 2005/6/30 12:30:00 |
| ⋮ | ⋮ |

FIG. 9

| CONTENT NAME | EXPIRY INFORMATION | CONTENT |
|---|---|---|
| CONTENT1.mpg | 2005/6/25 12:00:00 | CONTENT 1 |
| ⋮ | ⋮ | ⋮ |

TIME AUTHENTICATION DEVICE, TIME AUTHENTICATION METHOD, COMPUTER PROGRAM, RECORDING MEDIUM, INTEGRATED CIRCUIT, AND TIME AUTHENTICATION SYSTEM

TECHNICAL FIELD

The present invention relates to a system composed of a target device and a time authentication device that operates in accordance with a clock for authenticating a clock of the target device. More specifically, the present invention relates to a technique of selectively approving a clock that operates correctly.

BACKGROUND ART

In recent years, there are an increasing number of systems composed of a server and a client devices and each device has a clock. Such a system works on the precondition that each client clock is synchronized with the server clock.

An example of such systems includes a system in which a server holds a content with a fixed usage expiry and distributes the content with the usage expiry to a client. The client is allowed to play back the content on or before the usage expiry based on its clock.

A patent document 1 listed below discloses a technique of authenticating whether a client clock is in synchronism with a server clock and synchronizing the client clock with the server clock if the two clocks disagree.
[Patent Document 1]
  JP Patent Application Publication No. 2004-030572

DISCLOSURE OF THE INTENTION

Problems the Invention is Attempting to Solve

The technique disclosed in the patent document 1 above ensures that the server clock and the client clock are synchronized at one point in time. It is reasonably expected that the client clock operates correctly thereafter and the two clocks stay in synchronism. However, there is a risk that the client clock delays significantly as a result of removal of a battery that supplies power to the clock or as a result of a failure.

With this being the situation, it is desired to detect any clock within the system that operates incorrectly and to invalidate the incorrect clock. As a consequence, it is ensured that all the clocks within the system keep time within a predetermined permissible range from the server clock time.

In view of the above, the present invention aims to provide a time authentication device for distinguishing clocks that show time falling within the predetermined permissible range as compared with the time shown by the time authentication device.

Means for Solving the Problems

In order to achieve the above aim, the present invention provides a time authentication device for authenticating a target clock that measures a time and that is included in a target device. The time authentication device includes: a clock unit operable to a measure time; a storage unit operable to store a first time measured by the target clock and a second time measured by the clock unit when the first time is acquired; an acquiring unit operable to acquire a third time measured by the target clock and a fourth time measured by the clock unit when the third time is acquired; a judging unit operable to judge, based on the first time to the fourth time, whether a difference between a time measured by the target clock and a time measured by the clock unit falls within a permissible range; and an output unit operable to output an authentication result indicating that the target clock is valid if the difference is judged to fall within the permissible range, and that the target clock is invalid if the difference is judged to fall outside the permissible range.

Effects of the Invention

With the above structure, the time authentication device according to the present invention judges, based on the first time to the fourth time, whether the difference between the time measured by the target clock and the time measured by the clock unit falls within a permissible range. Consequently, it is possible to distinguish correct clocks that keep time within the permissible range as compared with the time measured by the time authentication device.

The judging unit may be operable to judge whether a third difference is smaller than or equal to a threshold. The third difference is a difference between (a) a first difference between the fourth time and the second time and (b) a second difference between the third time and the first time. The output unit may be operable to output an authentication result indicating that the target clock is valid if the third difference is judged to be smaller than or equal to the threshold and thus fall within the permissible range, and that the target clock is invalid if the third difference is judged to be larger than the threshold and thus fall outside the permissible range.

Alternatively, the judging unit may be operable to judge whether a third difference is smaller than or equal to a threshold. The third difference is a difference between (a) a first difference between the fourth time and the third time and (b) a second difference between the second time and the first time. The output unit may be operable to output an authentication result indicating that the target clock is valid if the third difference is judged to be smaller than or equal to the threshold and thus fall within the permissible range, and that the target clock is invalid if the third difference is judged to be larger than the threshold and thus fall outside the permissible range.

With the above structure, the time authentication device is enabled to distinguish other devices' clocks that are not any later than the threshold with reference to the time measured by the time authentication device.

The storage unit may store, as the second time, a time measured by the clock unit when the first time is acquired. The acquiring unit may acquire, as the fourth time, a time measured by the clock unit when the third time is acquired.

With this structure, the time authentication is performed using, as the fourth time, the time measured when the third time is acquired.

The storage unit may be operable to store, as the second time, a time measured by the clock unit when a request for sending the first time is issued to the target device. The acquiring unit may be operable to acquire, as the fourth time, a time measured by the clock unit when a request for sending the third time is issued to the target device.

With this structure, the time authentication is performed using, as the fourth time, the time measured when a request for sending the third time is issued.

The target device may be operable to receive from the time authentication device a request for sending a time, and sends to the time authentication device a time that is measured by the target clock when the request is received. The acquiring unit may include: a monitoring subunit operable to monitor the time measured by the clock unit; a request subunit operable, when the time measured by the clock unit reaches a time that is a predetermined time period after the second time, to issue to the target device a request for sending a time; a response acquiring subunit operable to acquire the third time sent from the target device in response to the time send request; and a time acquiring subunit operable to acquire, as the fourth time, a time measured by the clock unit when the third time is acquired.

With this structure, the time authentication is performed a predetermined time period after the second time.

The threshold may be "0". The judging unit may be operable to calculate the third difference that is a result of the first difference—the second difference and to judge whether the third difference is smaller than or equal to "0".

With this structure, the time authentication device is enabled to detect a target clock that is running slower than the clock unit.

The threshold may be a value calculated by multiplying the first difference by a predetermined ratio. The judging unit may be operable to judge whether the third difference is smaller than or equal to the value calculated by multiplying the first difference by the predetermined ratio.

With this structure, the threshold is determined accordingly to the time measurement interval.

The target device may be operable to use a content on or before a usage expiry of the content based on the target clock. The time authentication device may further include: a content storage unit operable to store a content having a usage expiry; and a send unit operable to send the content and the usage expiry to the target device if the authentication result indicates that the target clock is valid.

With this structure, if the authentication result indicates that the target clock is valid, the content and the usage expiry of the content is transmitted. Consequently, a judgment as to whether use of the content is permitted is made based on the valid clock. This prevents unauthorized use of the content beyond the usage expiry.

The sending unit may be operable to send, instead of the usage expiry, an expiry calculated by subtracting the third difference from the usage expiry.

With this structure, instead of the usage expiry, an expiry calculated by subtracting the third difference from the usage expiry is transmitted. This prevents unauthorized use of the content by the target device beyond the usage expiry.

The sending unit may be operable to send, instead of the usage expiry, an expiry calculated by the following expression:

the fourth time+(the usage expiry–the fourth time)×
(the first difference/the second difference).

With this structure, use of the content is permitted for a period determined in accordance with the extent of the difference between the time measured by the target clock and the time measured by the clock unit.

The acquiring unit may be operable to acquire, as the third time, a time measured when the target device requests to start playback of the content.

With this structure, the time authentication is performed at a time when the target device requests playback of the content.

The target device may be operable to store a content and a usage expiry of the content, and to use the content if a current time measured by the target clock is on or before the usage expiry. The time authentication device may further include: an instruction unit operable, if the judging unit judges that the difference is larger, to instruct the target device to rewrite the usage expiry so that use of the content is no longer permitted.

With this structure, the time authentication device is enabled to perform the time authentication process on the target device that is once permitted to use a content and thus already stores the usage expiry of the content. If the result of the newly performed time authentication indicates that the target clock is invalid, use of the content is prohibited.

In another aspect, the present invention provides a time authentication method for use by a time authentication device for authenticating a target clock that measures a time and that is included in a target device. The time authentication device includes: a clock unit operable to a measure time; and a storage unit operable to store a first time measured by the target clock and a second time measured by the clock unit when the first time is acquired. The method includes: an acquiring step of acquiring a third time measured by the target clock and a fourth time measured by the clock unit when the third time is acquired; a judging step of judging, based on the first time to the fourth time, whether a difference between a time measured by the target clock and a time measured by the clock unit falls within a permissible range; and an output step of outputting an authentication result indicating that the target clock is valid if the difference is judged to fall within the permissible range, and that the target clock is invalid if the difference is judged to fall outside the permissible range.

In yet another aspect, the present invention provides a computer program for use by a time authentication device for authenticating a target clock that measures a time and that is included in a target device. The time authentication device includes: a clock unit operable to a measure time; and a storage unit operable to store a first time measured by the target clock and a second time measured by the clock unit when the first time is acquired. The program includes code operable to cause the time authentication device to perform: an acquiring step of acquiring a third time measured by the target clock and a fourth time measured by the clock unit when the third time is acquired; a judging step of judging, based on the first time to the fourth time, whether a difference between a time measured by the target clock and a time measured by the clock unit falls within a permissible range; and an output step of outputting an authentication result indicating that the target clock is valid if the difference is judged to fall within the permissible range, and that the target clock is invalid if the difference is judged to fall outside the permissible range.

In yet another aspect, the present invention provides a computer-readable recording medium having the above-described computer program stored thereon.

In yet another aspect, the present invention provides an integrated circuit for use by a time authentication device for authenticating a target clock that measures a time and that is included in a target device. The integrated circuit includes: a clock unit operable to a measure time; a storage unit operable to store a first time measured by the target clock and a second time measured by the clock unit when the first time is acquired; an acquiring unit operable to acquire a third time measured by the target clock and a fourth time measured by the clock unit when the third time is acquired; a judging unit operable to judge, based on the first time to the fourth time, whether a difference between a time measured by the target clock and a time measured by the clock unit falls within a permissible range; and an output unit operable to output an authentication result indicating that the target clock is valid if the difference is judged to fall within the permissible range, and that the target clock is invalid if the difference is judged to fall outside the permissible range.

In yet another aspect, the present invention provides a time authentication system composed of a target device having a target clock operable to measure a time; and a time authentication device for authenticating the time measured by the target clock. The time authentication device includes: a clock unit operable to a measure time; a storage unit operable to store a first time measured by the target clock and a second time measured by the clock unit when the first time is acquired; an acquiring unit operable to acquire a third time measured by the target clock and a fourth time measured by the clock unit when the third time is acquired; a judging unit operable to judge, based on the first time to the fourth time, whether a difference between a time measured by the target clock and a time measured by the clock unit falls within a permissible range; and an output unit operable to output an authentication result indicating that the target clock is valid if the difference is judged to fall within the permissible range, and that the target clock is invalid if the difference is judged to fall outside the permissible range.

With the above structure, a judgment is made based on the first time to the fourth time as to whether the difference between the time measured by the target clock and the time measured by the clock unit falls within a permissible range. Consequently, it is possible to distinguish correct clocks that keep time within the permissible range as compared with the time measured by the time authentication device.

BRIEF DESCRIPTION OF THE DRAWINGS

FIG. 4 illustrates an example of data stored in a content storage unit;

FIG. 7 illustrates an example of a contents list generated by a control unit;

FIG. 9 illustrates an example of data stored in a content storage unit;

DESCRIPTION OF REFERENCES NUMERALS

1 Content Playback System
10 Network
11 Distribution Device
12 Playback Device
13 Display Unit
14 Keyboard
15 Display Device
16 Remote Controller
18 Playback Device
100 Device Information Storage Unit
101 Communication Unit
102 Encryption Unit
103 Clock Unit
104 Response Information Storage Unit
105 Signature Verification Unit
106 Public Key Storage Unit
107 Time Authentication Unit
108 Time Request Generating Unit
109 Time-Relation Information Generating Unit
110 Content Storage Unit
111 Random Number Generating Unit
113 Input Receiving Unit
114 Display Control Unit
115 Control Unit
201 Communication Unit
202 Battery Unit
204 Signature Generating Unit
205 Device Information Storage Unit
206 Content Storage Unit
207 Use-Permission Judging Unit
208 Decryption Unit
209 Playback Unit
210 Power Supply Unit
211 Control Unit
212 Input Receiving Unit
213 Display Control Unit

DETAILED DESCRIPTION OF THE INVENTION

The following describes a content playback system 1 according to an embodiment of the present invention.

Structure of Content Playback System 1

Figure 1:
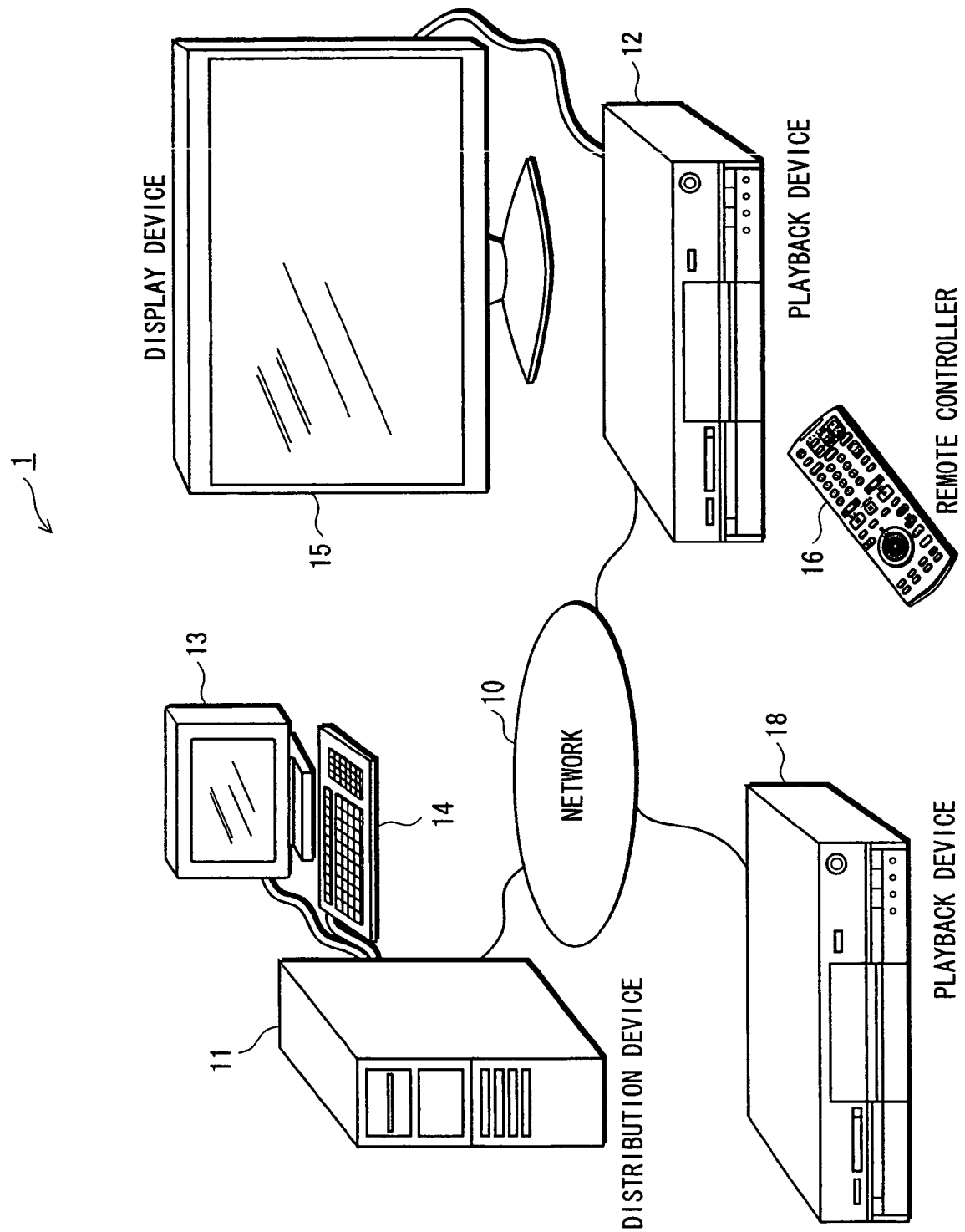
FIG. 1 is a schematic view illustrating a content playback system according to an embodiment of the present invention.

As illustrated in FIG. 1, the content playback system 1 is composed of a distribution device 11, a playback device 12, and a playback device 18. The distribution device 11 and the playback devices 12 and 18 are interconnected via a network 10.

The distribution device 11 is a computer system connected with a display unit 13 and a keyboard 14. The distribution device 11 stores digital contents (hereinafter, simply "contents"), such as movies, and distributes contents to the playback devices 12 and 18.

The playback device 12 is connected with a display device 15, which is a television monitor, and plays back a content received from the distribution device 11. Upon receipt of an instruction that is issued from a remote controller 16 in response to a user operation, the playback device 12 operates according to the received instruction.

Each content that the playback device 12 receives from the distribution device 11 has a fixed usage period during which playback of the content is permitted. The playback device 12 judges whether a current time is on or before the expiry and plays back the content only if the usage period has not expired yet. The judgment is made using a clock that is installed within the playback device and driven by power fed from a battery.

According to the content playback system 1, the playback device 12 is not allowed to play back a content if the user sets back the clock more than a permissible range, by removing the battery or tampering the clock in any other way. This arrangement prevents unauthorized playback of the content for an illicitly prolonged usage period.

The playback device 18 is identical in structure to the playback device 12.

Structure of Distribution Device 11

Figure 2:
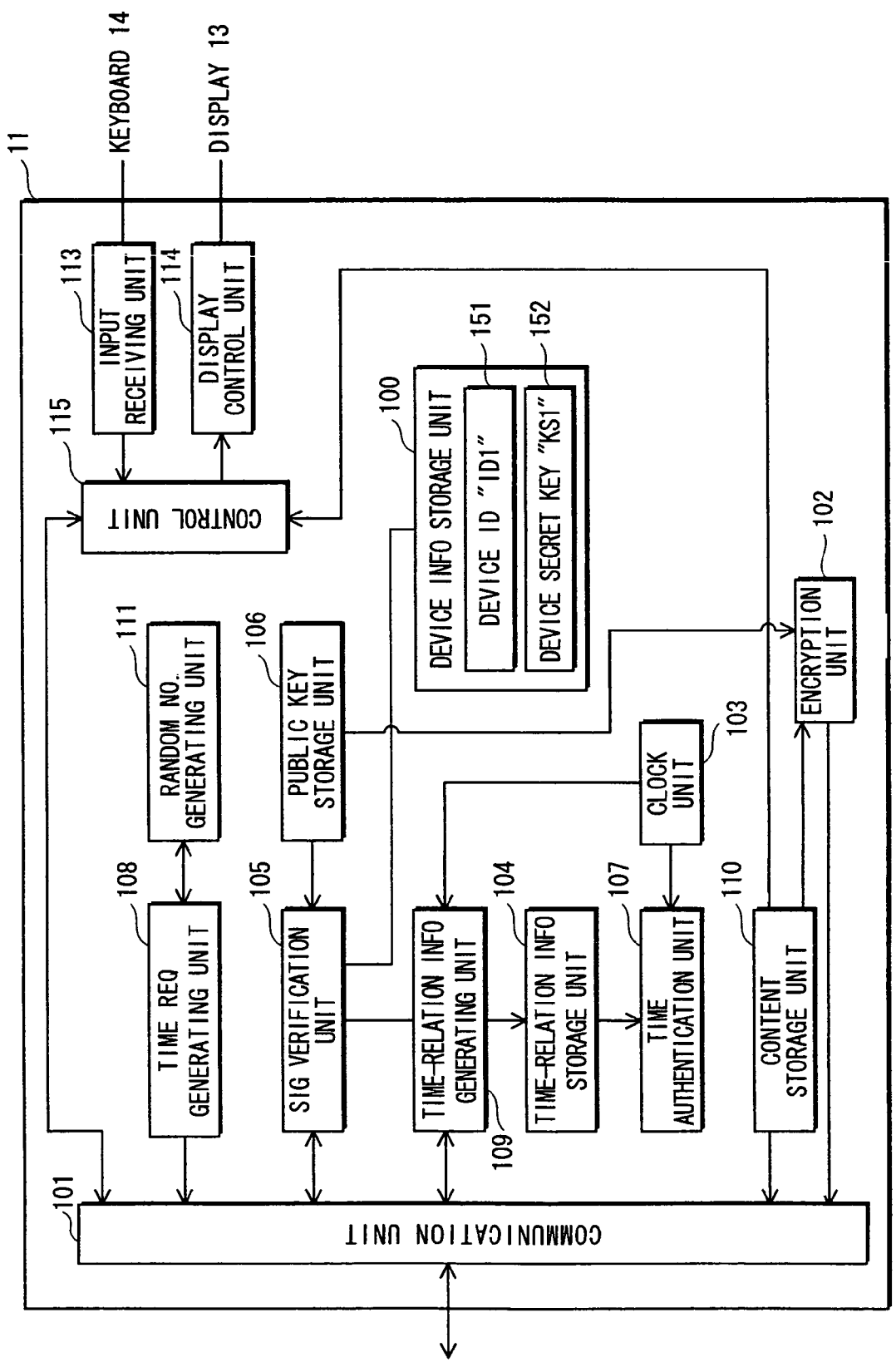
FIG. 2 is a block diagram of a distribution device.

As illustrated in FIG. 2, the distribution device 11 is composed of a device information storage unit 100 in communication unit 101, an encryption unit 102, a clock unit 103, a time-relation information storage unit 104, a signature verification unit 105, a public key storage unit 106, a time authentication unit 107, a time request generating unit 108, a time-relation information generating unit 109, a content storage unit 110, a random number generating unit 111, an input receiving unit 113, a display control unit 114, and a control unit 115.

Physically, the distribution device 11 is a computer system composed, for example, of a CPU, ROM, RAM, work memory, a hard disk, a video adapter, a network adapter. The RAM stores a computer program and the CPU operates in accordance with the computer program, so that the distribution device 11 achieves its functionality.

Device Information Storage Unit 100

The device information storage unit 100 is secure nonvolatile memory. As illustrated in FIG. 2, the device information storage unit 100 stores in advance a device identifier 151 that holds the value "ID1" and a device secret key 152 that holds the value "KS1".

A device identifier is a piece of identification information uniquely assigned to an individual device. The device identifier 151 is a particular piece of identification information that is uniquely assigned to the distribution device 11.

A device secret key "KSn" (where n is a natural number) is a secret key unique to an individual device and generated correspondingly to a device public key "KPn" that is a public key unique to the device.

Ciphertext encrypted with the device public key "KPn" (where n is a natural number) is decryptable with the device secret key "KSn". Similarly, ciphertext encrypted with the device secret key "KSn" is decryptable with the device public key "KPn".

In addition, a signature generated using the device public key "KPn" (where n is a natural number) is verified its authenticity using the device secret key "KSn". Similarly, a signature generated using the device secret key "KSn" is verified its authenticity using the device public key "KPn".

The device secret key 152 "KS1" is a particular piece of secret key information that is uniquely assigned to the distribution device 11 and generated correspondingly to the device public key "KP1".

For example, ciphertext encrypted with the device public key "KP1" is decryptable with the device secret key 152 "KS1". Similarly, ciphertext encrypted with the device secret key "KS1" 152 is decryptable with the device public key "KP1".

In addition, a signature generated using the device public key "KP1" is verified its authenticity using the device secret key "KS1"152. Similarly, a signature generated using the device secret key 152 "KS1" is verified its authenticity using the device public key "KP1".

Communication Unit 101, Clock Unit 103, & Public Key Storage Unit 106

The communication unit 101 is composed of a network adapter and carries out data transmission with the playback devices 12 and 18 via the network 10.

The clock unit 103 is a clock for measuring the date and time by counting up a counter every one second. More specifically, the clock unit 103 measures the passage of time in seconds since Jan. 1, 1970.

The clock unit 103 has a read register that is readable by other modules of the distribution device 11. For each count-up, the clock unit 103 converts the counter value into the "year/month/date time/minute/second" format and sets information indicating the time into the read register.

To more specific, for example, the read register is set to the time information "2005/6/14 10:31:40" that indicates Jun. 14, 2005, 10 o'clock 31 minutes 40 seconds. The other modules read the set time information.

The public key storage unit 106 is nonvolatile memory and stores, in advance, playback device identifiers all the playback devices included in the content playback system 1 and each playback device identifier is stored in pair with a device public key of a corresponding playback device.

Figure 3:
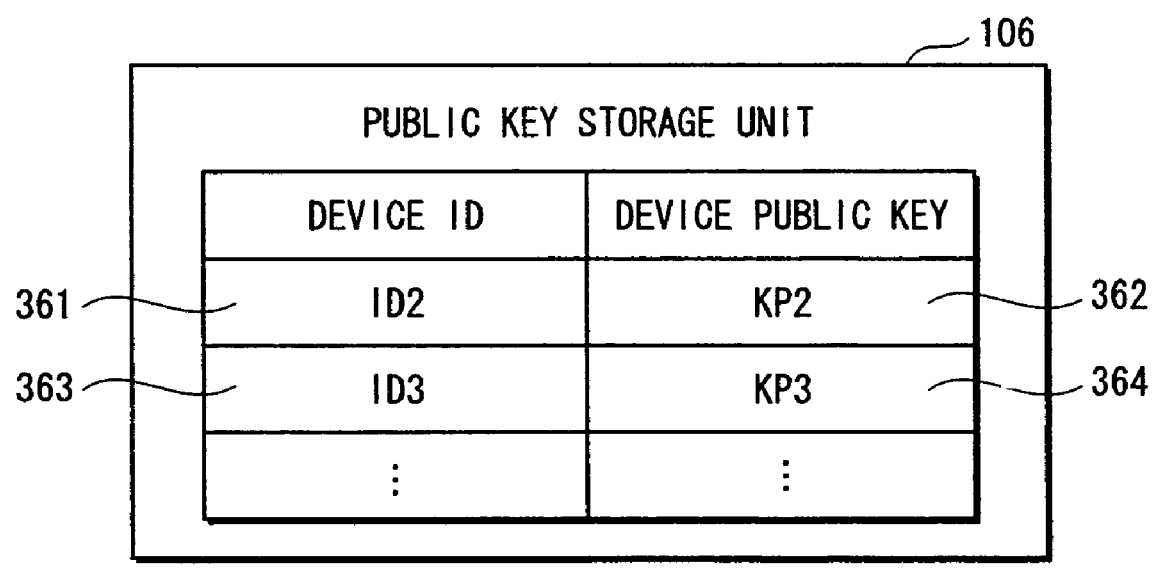
FIG. 3 illustrates an example of data stored in a public key storage unit.

In an example illustrated in FIG. 3, the public key storage unit 106 stores a pair of a playback device identifier 361 and a device public key 362. The playback device identifier 361 holds a value "ID2" identifying the playback device 12. The device public key 362 holds a value "KP2" that is a public key assigned to the playback device 12. The public key storage unit 106 also stores a pair of a playback device identifier 363 and a device public key 364. The playback device identifier 363 holds a value "ID3" identifying the playback device 18. The device public key 364 holds a value "KP3" that is a public key assigned to the playback device 18.

The content storage unit 110 is a hard disk and stores one or more content files. Each content file contains a content, a name of the content, and expiry information indicating a usage expiry of the content. In an example illustrated in FIG. 4, the content storage unit 110 stores content files 321 and 322. The content file 321 contains a content name 331 holding the value "content1.mpg" and expiry information 332 holding the value "2005/6/25 12:00:00", and a content 333 "content 1". The content file 322 contains a content name 334 holding the value "content2.mpg", expiry information 335 holding the value "2005/6/30 12:30:00", and a content 336 "content 2".

Time-Relation Information Storage Unit 104 & Random Number Generating Unit 111

The information storage unit 104 stores time-relation information. Each piece of time-relation information is composed of a playback device identifier identifying one of the playback devices, a playback-device-time acquired from the playback device, and a distribution-device-time indicating the time at which the playback-device-time is acquired.

Figure 5:
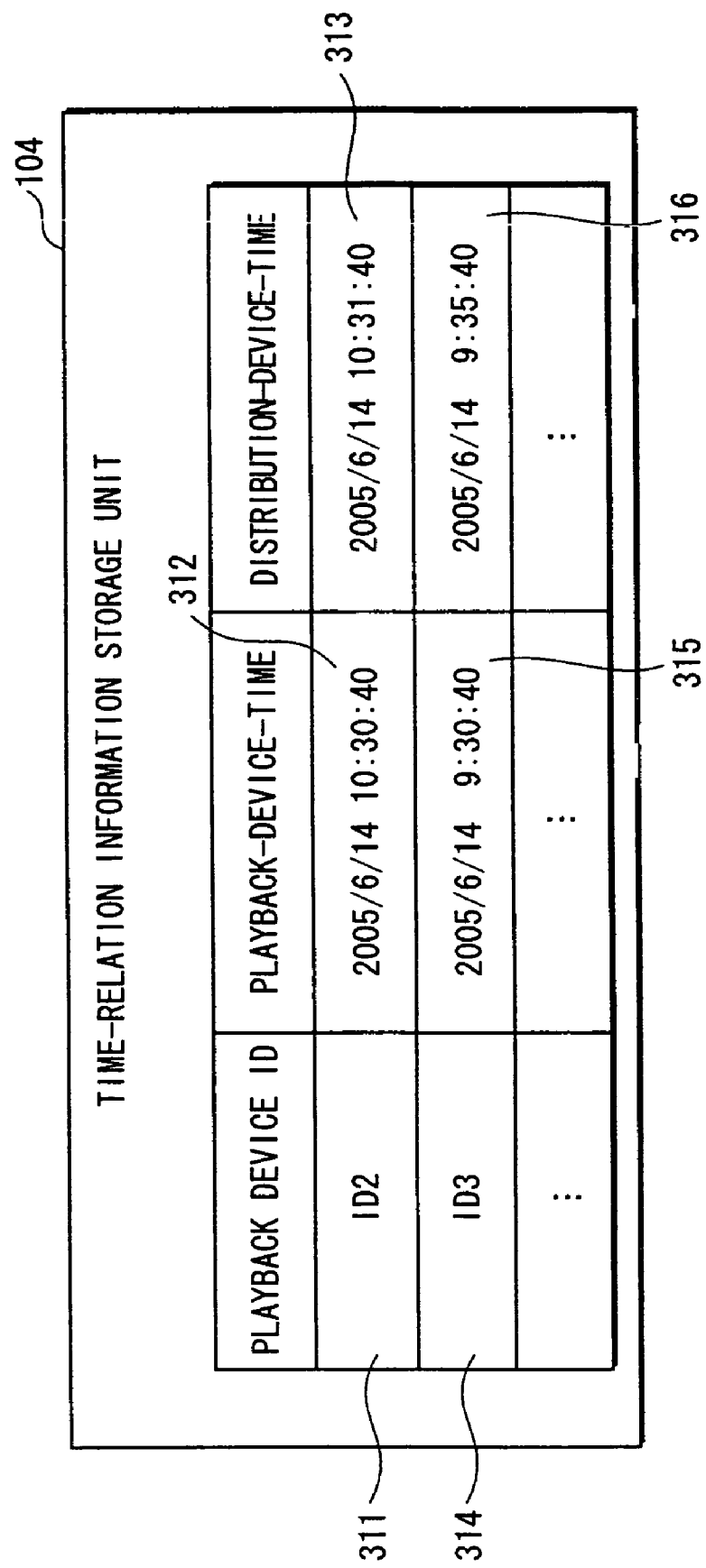
FIG. 5 illustrates an example of data stored in a time-relation information storage unit.

In an example illustrated in FIG. 5, the time-relation information storage unit 104 stores a piece of time-relation information composed of a playback device identifier 311 (ID2) identifying the playback device 12, a playback-device-time 312 (2005/6/14 10:30:40) acquired from the playback device 12, and a distribution-device-time 313 (2005/6/14 10:31:40). Similarly, the time-relation information storage unit 104 stores another piece of time-relation information composed of a playback device identifier 314 (ID3), a playback-device-time 315 (2005/6/14 9:30:40), and a distribution-device-time 316 (2005/6/14 9:35:40) indicating the time at which the playback-device-time is acquired.

The time request generating unit 108 transmits a random number generation instruction to the random number generating unit 111 at predetermined timing or upon receipt of a time request from the control unit 115. In response, the time request generating unit 108 receives a sending-end random number from the random number generating unit 111. The sending-end random number is a random number generated by the random number generating unit 111.

The predetermined timing mentioned above may be (1) a time at which the playback device 12 is connected to the network 10 and carries out communications with the distribution device 11 for the first time, (2) a predetermined time of day, such as 12:00 every day, (3) a date and time determined by the distribution device 11 at random.

The time request generating unit 108 generates time request information that includes the received sending-end random number, and transmits the generated time request information to the playback device 12 via the communication unit 101.

The random number generating unit 111 generates a random number in response to a random-number generation instruction from the time request generating unit 108, and transmits the random number as a sending-end random number to the time request generating unit 108.

Signature Verification Unit 105

The signature verification unit 105 receives, from the playback device via the communication unit 101, a playback device identifier that identifies the playback device and response information that is sent in response to the time request.

The response information includes the playback-device-time generated by the playback device identified by the playback device identifier and the playback-device-time is concatenated with the random number. The response information also includes a signature generated from the concatenated data.

The signature verification unit 105 reads, from the public key storage unit 106, a device public key that corresponds to the received playback device identifier, and verifies authenticity the signature using the read device public key.

If the signature is valid, the signature verification unit 105 transmits to the control unit 115 a signature verification result that includes the playback device identifier and the playback-device-time and that indicates that the signature is valid. If the signature is invalid, the signature verification unit 105 transmits to the control unit 115 a signature verification result indicating that the signature is invalid.

Time Authentication Unit 107

The time authentication unit 107 receives a time authentication instruction from the control unit 115. The time authentication instruction includes a target device identifier and a target time. In response, the time authentication unit 107 reads, as an authentication time, a time from the clock unit 103. Then, the time authentication unit 107 reads, from the time-relation information storage unit 104, a playback-device-time and a distribution-device-time that correspond to the playback device identifier matching the target device identifier.

Figure 6:
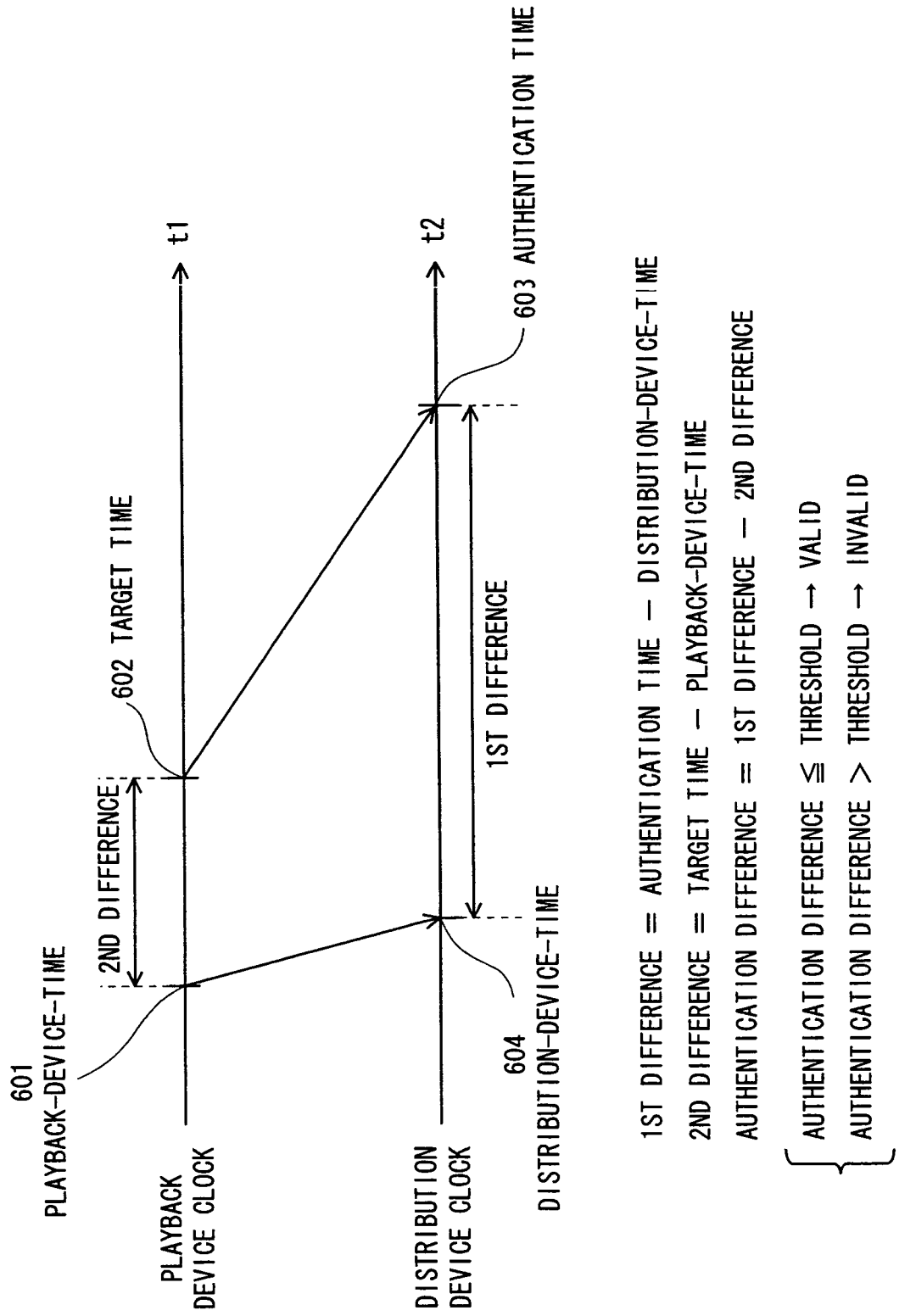
FIG. 6 is a schematic view illustrating a relation among times used to calculate an authentication difference.

FIG. 6 is a schematic view illustrating a relation among a playback-device-time 601 indicated by playback-device-time information, a target time 602 indicated by the target-time information, an authentication time 603 indicated by authentication time information, a distribution-device-time 604 indicated by the distribution-device-time information.

In FIG. 6, "t1" represents the time axis of time measured by the clock unit 203 of the playback device 12. Similarly, "t2" represents the time axis of time measured by the clock unit 103 of the distribution device 11. On the respective time axes t1 and t2, points in time closer to the right-hand side of the figure are more current.

The time authentication unit 107 calculates a first difference by subtracting the distribution-device-time from the authentication time.

Next, the time authentication unit 107 calculates a second difference by subtracting the playback-device-time from the target time.

Further, the time authentication unit 107 calculates an authentication difference by subtracting the second difference from the first difference. The time authentication unit 107 then judges whether the authentication difference is smaller than or equal to a time period indicated by a predetermined threshold.

The threshold is determined depending on a permissible delay time of the clock unit 203 of the playback device 12, as compared with the clock unit 103. The specific value is determined according to the system design.

If the authentication difference is judged to be smaller than or equal to the threshold, the time authentication unit 107 transmits playback restriction information indicating playback permission, to the playback device 12 via the communication unit 101. In addition, the time authentication unit 107 transmits a time authentication result indicating playback permission to the control unit 115. On the other hand, if the authentication difference is judged to be larger than the threshold, the time authentication unit 107 transmits playback restriction information indicating playback prohibition, to the playback device 12 via the communication unit 101. In addition, the time authentication unit 107 transmits a time authentication result indicating playback prohibition to the control unit 115.

Encryption Unit 102, Input Receiving Unit 113, & Display Control Unit 114

The encryption unit 102 receives from the control unit 115 a playback device identifier and a name of content requested for playback. Upon receipt, the encryption unit 102 reads a device public key corresponding to the received playback device identifier from the public key storage unit 106. The encryption unit 102 also reads from the content storage unit 110 a content having a content name that matches the received content name and encrypts the read content with the read device public key to generate an encrypted content.

The encryption unit 102 reads expiry information of the content having that content name, and transmits the content name, the encrypted content, and the expiry information to the playback device 12 via the communication unit 201.

The time-relation information generating unit 109 receives a time-relation information generation instruction that includes a playback device identifier and a playback-device-time from the control unit 115. In response, the time-relation information generating unit 109 reads a time as the distribution-device-time from the clock unit 103 and generates time-relation information that is composed of the playback device identifier, the playback-device-time, and the distribution-device-time, and stores the time-relation information into the time-relation information storage unit 104.

The input receiving unit 113 receives a user operation made on the keyboard 14 and outputs an instruction responsive to the received user operation to the control unit 115.

The display control unit 114 is a graphics adapter for generating video and audio signals, and causing the resulting signals to be presented on the display unit 13.

Control Unit 115

The control unit 115 mainly performs the following three process: (a) time-relation information generation; (b) list generation; and (c) content playback.

(a) Process of Generating Time-Relation Information

The control unit 115 receives a signature verification result from the signature verification unit 105 at predetermined timing.

The signature verification result indicates whether the signature is valid or invalid. If the signature is valid, the signature verification result also includes the playback device identifier and the playback-device-time.

If the signature verification result received from the signature verification unit 105 indicates that the signature is invalid, the control unit 115 terminates the process. If the signature verification result indicates that the signature is invalid, the control unit 105 instructs the time-relation information generating unit 109 to generate time-relation information composed of the playback device identifier and the playback-device-time that are included in the signature verification result.

(b) Process of Generating List

The control unit 115 receives a list request via the communication unit 101. Upon receipt of the list request, the control unit 115 extracts, from the content files stored on the content storage unit 110, the content names and expiry information to generate contents list.

For example, when the content storage unit 110 stores the content files as illustrated in FIG. 4, the control unit 115 generates a contents list as illustrated in FIG. 7. The contents list includes the content names 454 and 456 paired with the pieces of expiry information 455 and 457, respectively. The content name 454 holds the value "content1.mpg" and the content expiry information 455 holds the value "2005/6/25 12:00:00". The content name 454 holds the value "content2.mpg" and the expiry information 457 includes the value "2005/6/30 12:30:00".

The control unit 115 transmits the thus generated contents list via the communication unit 101 to a device that issued the list request.

(c) Process of Content Playback

The control unit 115 acquires via the communication unit 101 a content request that includes a playback device identifier and the name of a content requested for playback. Upon receipt of the content request, the control unit 115 issues a time request to the time request generating unit 108 and receives the signature verification result sent from the signature verification unit 105 in response to the time request.

The signature verification result indicates the signature is either valid or invalid. If the signature is valid, the signature verification result also includes the playback device identifier and the playback-device-time.

If the signature verification result received from the signature verification unit 105 through the content playback process indicates that the signature is invalid, the control unit 115 terminates the process. On the other hand, if the signature verification result indicates that the signature is valid, the control unit 115 transmits to the time authentication unit 107 a time authentication instruction that includes a target device identifier and a target time. Note that the target device identifier is the playback device identifier received from the signature verification unit 105, and that the target time is the playback-device-time received from the signature verification unit 105.

In response to the time authentication instruction, the control unit 115 receives a time authentication result from the time authentication unit 107.

If the time authentication result indicates playback permission, the control unit 115 transmits the requested content name and the playback device identifier to the encryption unit 102. On the other hand, if the time authentication result indicates playback prohibition, the control unit 115 terminates the process.

Structure of Playback Device 12

Figure 8:
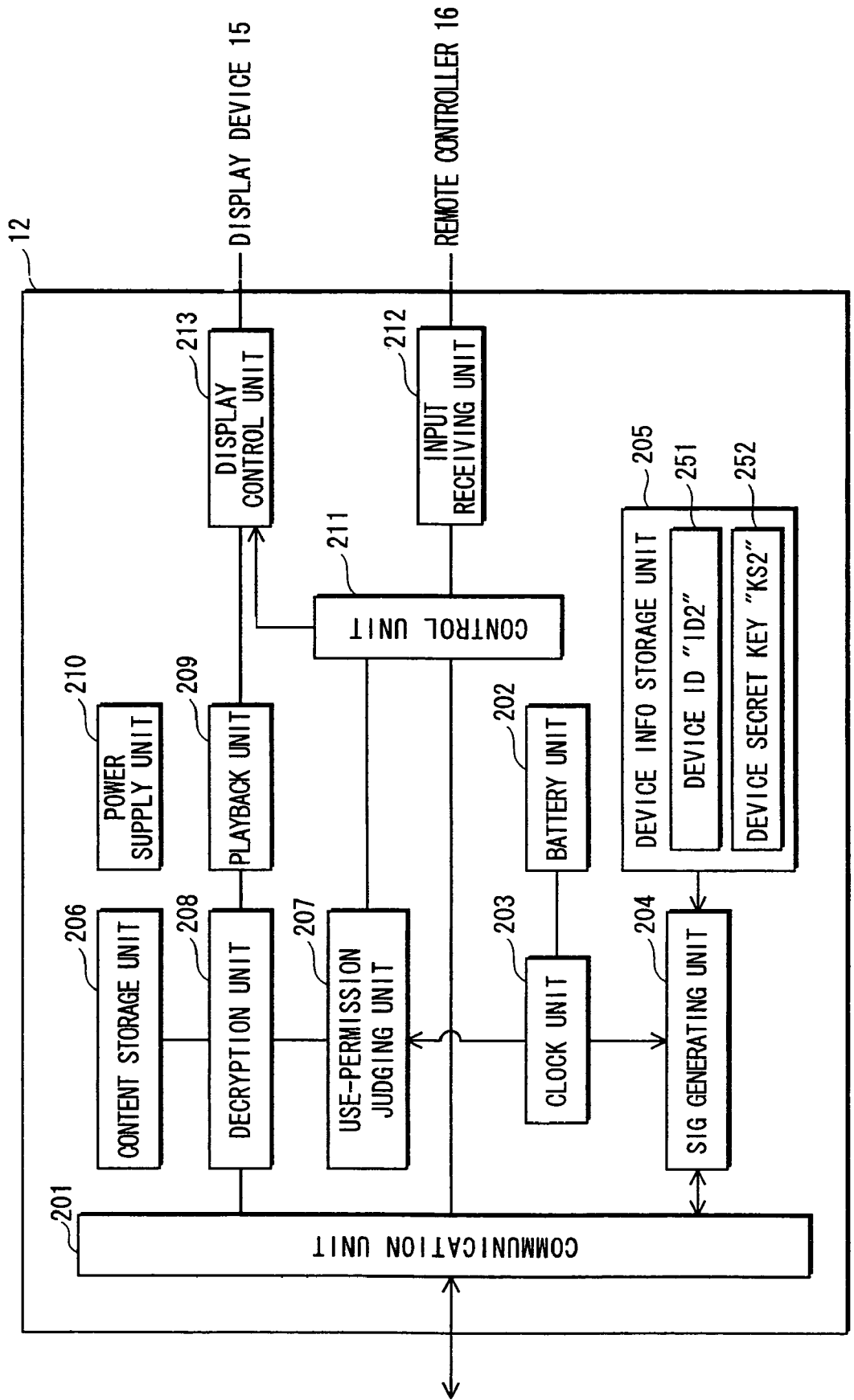
FIG. 8 is a block diagram of a playback device.

As illustrated in FIG. 8, the playback device 12 is composed of a communication unit 201, a battery unit 202, a clock unit 203, a signature generating unit 204, a device information storage unit 205, a content storage unit 206, a use-permission judging unit 207, a decryption unit 208, a playback unit 209, a power supply unit 210, a control unit 211, an input receiving unit 212, and a display control unit 213.

Physically, the playback device 12 is a computer system composed, for example, of a CPU, ROM, RAM, work memory, a hard disk, a video adapter, a network adapter. The RAM stores a computer program and the CPU operates in accordance with the computer program, so that the playback device 12 achieves its functionality.

Device Information Storage Unit 205

The device information storage unit 205 is secure nonvolatile memory. As illustrated in FIG. 8, the device information storage unit 205 stores in advance a device identifier 251 that holds the value "ID2" and a device secret key 252 that holds the value "KS2".

The device identifier 251 is identification information uniquely assigned to the playback device 12.

The device secret key 252 "KS2" is secret key information uniquely assigned to the playback device 12. The device secret key "KS2" is generated correspondingly to the device public key "KP2".

In the playback device 18, the device information storage unit stores in advance the device identifier "ID3" and the device secret key "KS3".

Communication Unit 201, Clock Unit 203, Battery Unit 202, Signature Generating Unit 204

The communication unit 201 is composed of a network adapter that carries out data transmission with the distribution device 11 and the playback device 18.

The clock unit 203 is a clock for measuring the date and time by counting up a counter every one second. More specifically, the clock unit 203 measures the passage of time in seconds since Jan. 1, 1970.

The clock unit 203 has a read register that is read by other modules of the playback device 12. For each count-up, the clock unit 203 converts the counter value into the "year/month/date time/minute/second" format and sets information indicating the time into the read register.

To more specific, for example, the read register is set to the time information "2005/6/14 10:31:40" that indicates Jun. 14, 2005, 10 o'clock 31 minutes 40 seconds. The other modules read the set time information.

The battery unit 202 is a battery for supplying power to the clock unit 203.

The signature generating unit 204 receives time request information from the distribution device 11 via the communication unit 201. The time request information includes a sending-end random number generated by the distribution device 11.

Upon receipt of the time request information, the signature generating unit 204 reads, as the playback-device-time, a time from the clock unit 203. The signature generating unit 204 then concatenates the playback-device-time and the sending-end random number included in the time request information to generate concatenated data. In addition, the signature generating unit 204 reads the device secret key 252 "KS2" from the device information storage unit 205 and signs the concatenated data using the device secret key 252. The signature generating unit 204 generates response information that is composed of the concatenated data and the resulting signature.

The signature generating unit 204 reads the device identifier 251 "ID2" from the device information storage unit 205. The signature generating unit 204 then transmits the device identifier 251, which serves as the playback device identifier, and the response information to the distribution device 11 via the communication unit 201.

Use-Permission Judging Unit 207

Upon receipt of the expiry information from the playback device, the use-permission judging unit 207 reads a time from the clock unit 203 and compares the read time with the expiry information to judge whether use of the content is permitted.

The use-permission judging unit 207 judges that use of the content is permitted if the read time is equal to or earlier than the time indicated by the expiry information. On the other hand, the use-permission judging unit 207 judges that use of the content is prohibited if the read time is later than the time indicated by the expiry information.

Suppose, for example, the value of time information is "2005/6/14 10:31:40" and the value of expiry information is "2005/6/25 12:00:00". In this case, since the date and time indicated by the read time information is earlier than the date and time indicated by the expiry information. Thus, the use-permission judging unit 207 judges that use of the content is permitted.

If judging that use of the content is prohibited, the use-permission judging unit 207 terminates the process. On the other hand, if judging that use of the content is permitted, the use-permission unit 207 transmits a decryption instruction to the decryption unit 208.

Content Storage Unit 206

The content storage unit 206 is a hard disk and stores one or more content files written by the decryption unit 208. Each content file contains an encrypted content, a name of the content, and expiry information of the content.

In an example illustrated in FIG. 9, the content storage unit 206 stores a content file 402 that contains a content name 403 holding the value "content1.mpg", expiry information 404 holding the value "2005/6/25 12:00:00", and the content "content1" 405.

Decryption Unit 208, Playback Unit 209, Display Control Unit 213 & Power Supply Unit 210

The decryption unit 208 receives the content name from the control unit 211 and the decryption instruction from the use-permission judging unit 207. Upon receipt of the decryption instruction, the decryption-unit 208 reads the device secret key 252 "KS2" from the device information storage unit 205 and decrypts the encrypted content using the device secret key "KS2", and transmits the decrypted content to the playback unit 209.

The playback unit 209 receives the content decrypted by the decryption unit, generates video and audio signals from the decrypted content, and transmits the video and audio signals to the display control unit 213.

The display control unit 213 is a graphics adapter. The display control unit 213 receives video and audio signals from the playback unit 209 and outputs the received video and audio signals to the display device 15 to produce video and audio output.

In addition, the display control unit 213 receives a contents list from the control unit 211 and displays the received contents list on the display device 115.

The power supply unit 210 supplies power to all the modules of the playback device 12 except for the clock unit 203 and the battery unit 202.

Control Unit 211 & Input Receiving Unit 212

The control unit 211 acquires an instruction from the input receiving unit 212 and operates accordingly to the received instruction.

For example, the control unit 211 receives a list acquisition instruction from the input receiving unit 212 and transmits a list request to the distribution device 11 via the communication unit 201. In response, the control unit 211 receives a contents list from the distribution device 11 and transmits the received contents list to the display control unit 213.

In another example, the control unit 211 receives from the input receiving unit 212 the name of a content that the user requests for playback and reads the device identifier 251, which holds the value "ID2", from the device information storage unit 205. The control unit 211 then transmits a content request to the distribution device 11 via the communication unit 201. The content request includes the requested content name and the playback device identifier that holds the value "ID2".

In addition, the control unit 211 receives playback restriction information via the communication unit 201. If the received playback restriction information indicates playback prohibition, the control unit 211 terminates the process. On the other hand, if the received playback restriction information indicates playback permission, the control unit 211 continues the playback process of the content.

In addition, the control unit 211 receives an encrypted content along with the name and expiry information of the content via the communication unit 201. The control unit 211 then generates a content file containing the encrypted content, the content name, and the expiry information and stores the generated content file into the content storage unit 206. In addition, the control unit 211 transmits the expiry information to use-permission judging unit 207.

The input receiving unit 212 receives infrared light emitted by the remote controller 16 and extracts, from the infrared light, signals generated responsive to user operations made to the buttons on the remote controller 16. The input receiving unit 212 outputs the extracted signals to the control unit 211.

For example, an extracted signal is indicative of a list acquisition instruction. Upon receipt of such a signal, the input receiving unit 212 outputs a list instruction to the control unit 211.

Operation

The content playback system 1 operates to carry out the time-relation information generating process and the content playback process. First, a description is given of (1) response information acquiring process that is included in both the time-relation information generating process and the content playback process. Then, a description is given sequentially of (2) time-relation information generating process and (3) content playback process.

(1) Response Information Acquiring Process

Figure 10:
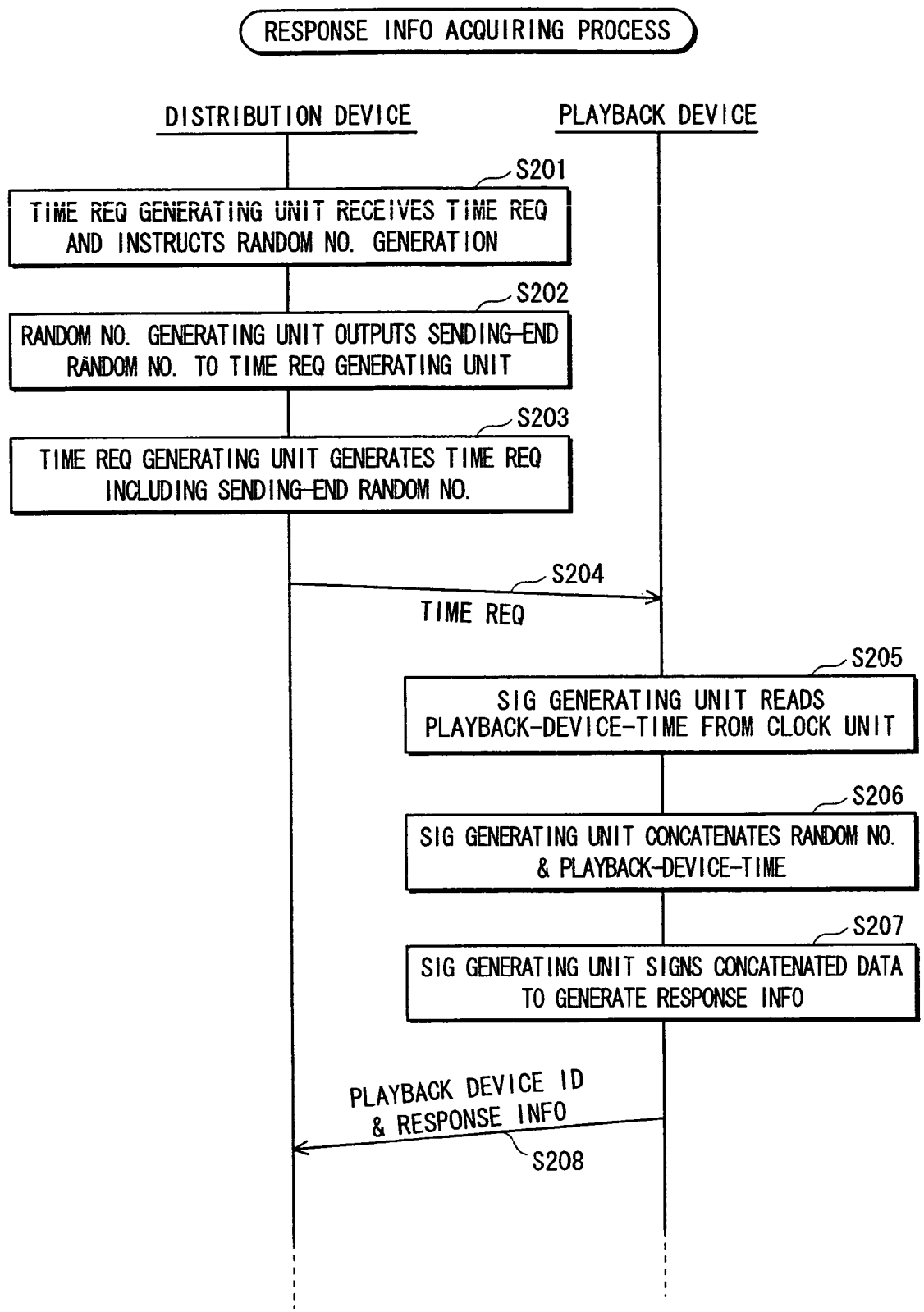
FIG. 10 is a flowchart of a response information acquiring process.

The following describes the response information acquiring process with reference to FIG. 10.

In the distribution device 11, the time request generating unit 108 receives a time request at predetermined timing or from the control unit 115. Upon recipient of the time request, the time request generating unit 108 generates a random-number generation instruction to the random number generating unit 111 (step S201).

Upon receipt of the random-number generation instruction from the time request generating unit 108, the random number generating unit 111 generates a random number and transmits, as a sending-end random number, the generated random number to the time request generating unit (step S202).

Upon receipt of the sending-end random number, the time request generating unit 108 generates the time request information that includes the sending-end random number (step S203) and transmits the generated time request information to the playback device 12 via the communication unit 101 (Step S204).

In the playback device 12, the signature generating unit 204 receives the time request information via the communication unit 201.

The signature generating unit 204 reads, as the playback-device-time, a time from the register of the clock unit 203 (step S205). The signature generating unit 204 then concatenates the playback-device-time and the sending-end random number that is included in the time request information, so that concatenated data is generated (step S206).

The signature generating unit 204 reads the device secret key 252 "KS2" from the device information storage unit 205.

The signature generating unit 204 signs the concatenated data using the device secret key 252 and generates response information that includes the resulting signature and the concatenated data (step. S207).

The signature generating unit 204 reads the device identifier 251 that holds the value "ID2" from the device information storage unit 205. The signature generating unit 204 then transmits the device identifier 251 that serves as the playback device identifier and the response information to the distribution device 11 via the communication unit 201 (step S208).

In the distribution device 11, the signature verification unit 105 receives the playback device identifier and the response information via the communication unit 101.

(2) Time-Relation Information Generating Process

Figure 11:
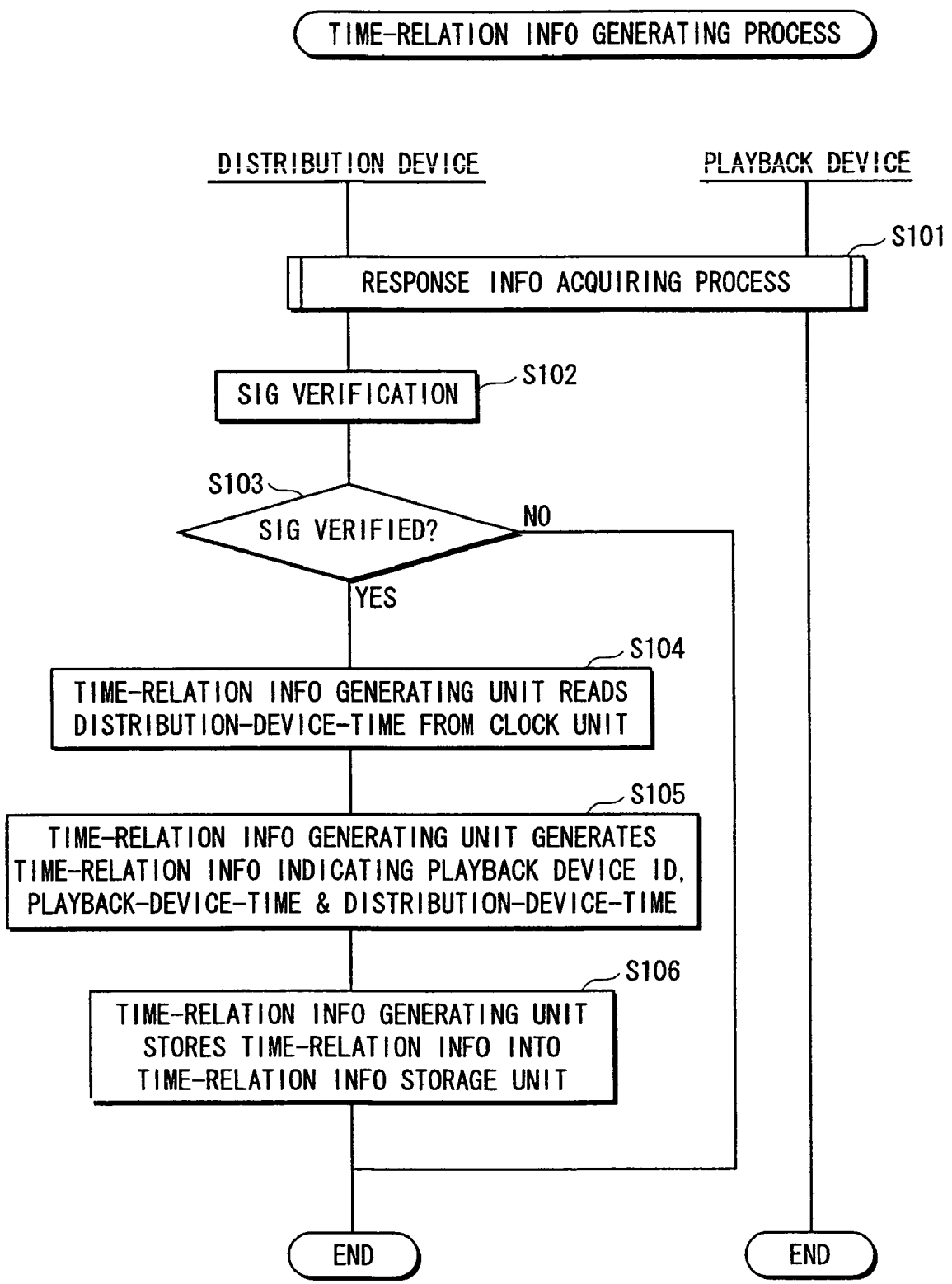
FIG. 11 is a flowchart of a time-relation information generating process.

The following describes the time-relation information generating process with reference to FIG. 11.

The time request generating unit 108 transmits a random-number generation instruction to the random number generating unit 111 at predetermined timing.

Next, the above-described response information acquiring process is performed. Through the process, the signature verification unit 105 receives the playback device identifier and the response information from the playback device 12 (step S101).

The signature verification unit 105 then reads, from the public key storage unit 106, the verification public key "KP2" that corresponds to the received playback device identifier "ID2" and verifies authenticity of the signature of the received response information using the verification public key "KP2" (step S102).

If the signature turns out to be invalid (step S103: NO), the signature verification unit 105 transmits a signature verification result indicates that the signature is invalid to the control unit 115. Upon receipt of the signature verification result, the control unit 115 terminates the process.

If the signature turns out to be valid (step S103: YES), the signature verification unit 105 transmits an time-relation information generation instruction to the time-relation information generating unit 109. The generation instruction includes the playback device identifier and the playback-device-time included in the response information.

Upon receipt of the generation instruction for time-relation information, the time-relation information generating unit 109 reads, as a distribution-device-time, a time currently written by the clock unit 103 into the register (step S104).

The time-relation information generating unit 109 associates the distribution-device-time with the playback device identifier and the playback-device-time, so that time-relation information is generated (step S105).

The time-relation information generating unit 109 stores the generated time-relation information into the time-relation information storage unit 104 (step S106).

(3) Content Playback Process

Figure 12:
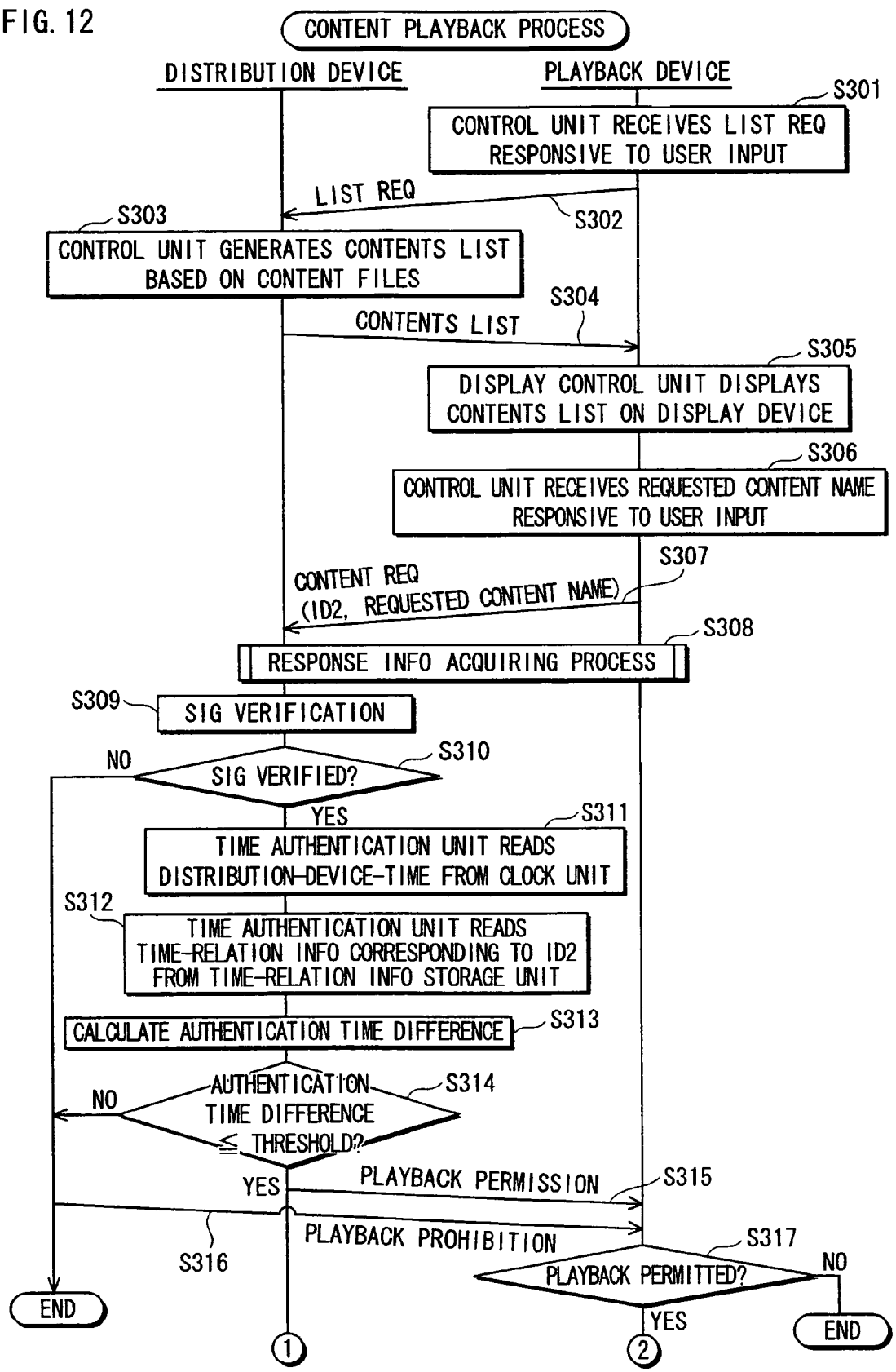
FIG. 12 is a flowchart of a content playback process.
Figure 13:
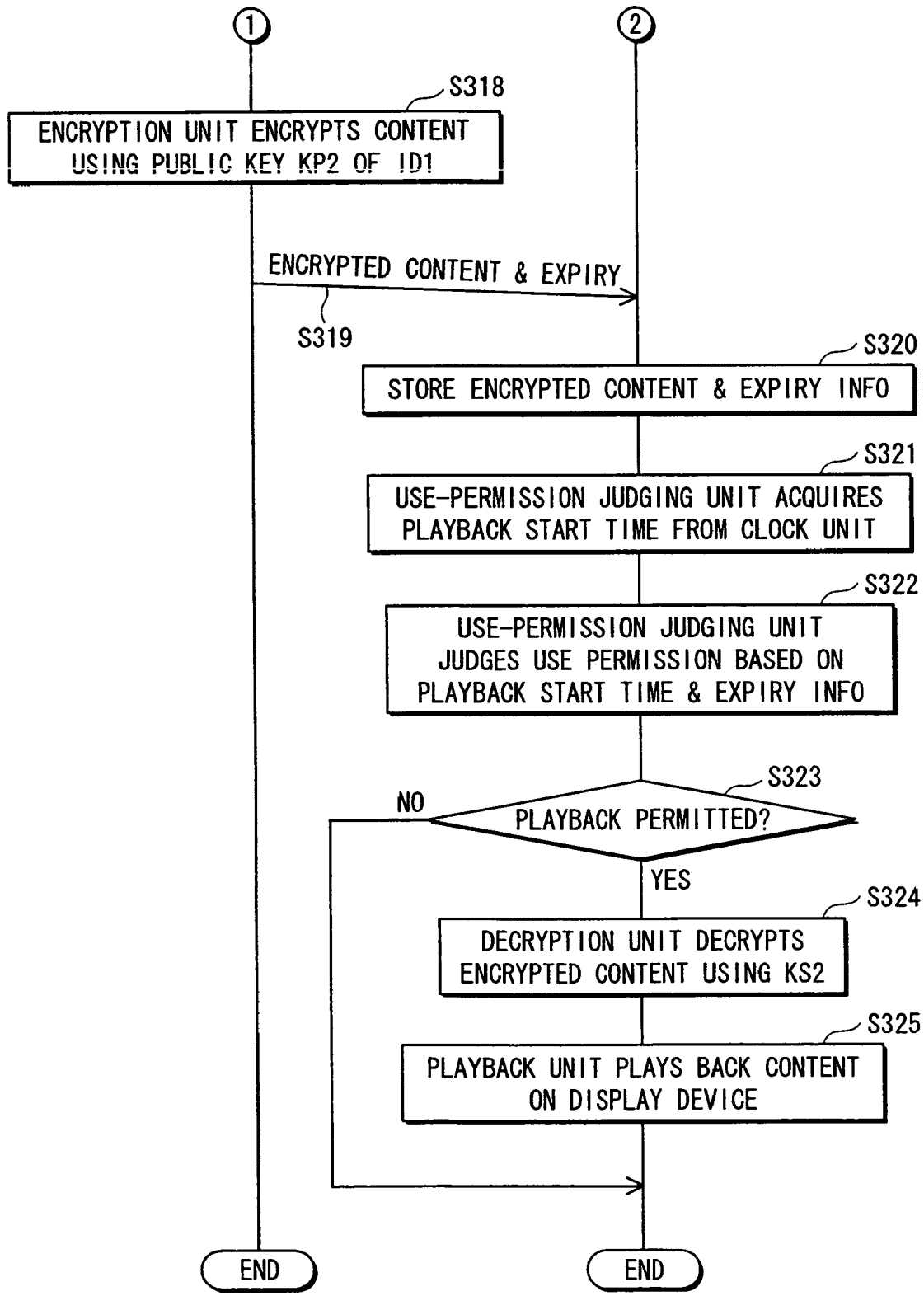
FIG. 13 is a flowchart of the content playback process.

The following describes the content playback process with reference to FIGS. 12 and 13.

The user operates the remote controller 16 of the playback device 12 to issue an instruction for list acquisition to the input receiving unit 212.

The input receiving unit 212 acquires the list acquisition instruction (step S301), and transmits the received instruction to the control unit 211.

Upon receipt of the list acquisition instruction, the control unit 211 transmits a list request to the distribution device 11 via the communication unit 201 (step S302).

In the distribution device 11, the control unit 115 receives the list request via the communication unit 101.

The control unit 115 generates a contents list from the content files stored in the content storage unit 110 (step S303).

The control unit 115 then transmits the thus generated contents list to the playback device 12 via the communication unit 101 (step S304).

In the playback device 12, the control unit 211 receives the contents list via the communication unit 201 and transmits the received contents list to the display control unit 213.

The display control unit 213 displays the contents list on the display device 15 (step S305).

The user selects a content requested for playback from the contents list displayed on the display device 15 and operates the remote controller 16 to input the requested content name. Upon receipt of the user operation, the remote controller 16 informs the input receiving unit 212 about the content name. Upon receipt of the requested content name, the input receiving unit 212 transmits the received content name to the control unit 211.

Upon receipt of the requested content name (step S306), the control unit 211 reads the device identifier 251 "ID2" from the device information storage unit 205 and transmits a content request to the distribution device 11 via the communication unit 201 (step S307). The content request includes the requested content name and the playback device that holds the value "ID2".

In the distribution device 11, the control unit 115 receives the content request via the communication unit 101.

Upon receipt of the content request, the control unit 115 transmits a time request to the time request generating unit 108.

Next, the above-described response information acquiring process is performed (step S308). Through the process, the signature verification unit 105 of the distribution device 11 receives the playback device identifier and the response information from the playback device 12.

The signature verification unit 105 reads, from the public key storage unit 106, the public key "KP2" that corresponds to the playback device identifier holding the value of "ID2" and verifies authenticity of the signature attached to the received response information (step S309).

If the signature is invalid (step S310: NO), the signature verification unit 105 transmits, to the control unit 115, a signature verification result indicating that the signature is invalid. The control unit 115 then transmits playback restriction information indicating playback prohibition to the playback device 12 via the communication unit 101 and terminates the process.

If the signature is valid (step S310: YES), the signature verification unit 105 transmits, to the time authentication unit 107, a time authentication instruction that includes a target device identifier and a target time. Here, the target device identifier is set to indicate the received playback device identifier, whereas the target time is set to indicate the playback-device-time that is included in the received response information.

Upon receipt of the time authentication instruction that includes the target device identifier and the target time, the time authentication unit 107 reads, as an authentication time, a time from the clock unit 103 (step S311). Next, the time authentication unit 107 reads, from the time-relation information storage unit 104, a piece of time-relation information that includes a playback device identifier matching the target device identifier (step S312).

The time authentication unit 107 then calculates an authentication difference as follows, using the playback-devicetime and the distribution-device-time that are included in the read time-relation information.

The time authentication unit 107 calculates a first difference by subtracting the distribution-device-time from the authentication time, and also calculates a second difference by subtracting the playback-device-time from the target time. Then, the time authentication unit 107 calculates an authentication difference by subtracting the second difference from the first difference (step S313).

The time authentication unit 107 judges whether the authentication difference is smaller than a predetermined threshold. If the authentication difference is smaller than the threshold (step S314: YES), the time authentication unit 107 transmits playback restriction information indicating playback permission to the playback device 12 via the communication unit 101. In addition, the time authentications unit 107 transmits a time authentication result indicating playback permission to the control unit 115 (step S315). On the other hand, if the authentication difference is larger than or equal to the threshold (step S314: NO), the time authentication unit 107 transmits playback restriction information indicating playback prohibition to the playback device 12 via the communication unit 101. In addition, the time authentication unit 107 transmits a time authentication result indicating playback prohibition to the control unit 115 (step S316).

In the playback device 12, the control unit 211 receives playback restriction information via the communication unit 201. If the received playback restriction information indicates playback prohibition (step S317: NO) the control unit 211 terminates the process. On the other hand, if the playback restriction information indicates playback permission (step S317: YES), the control unit 211 continues the process.

The encryption unit 102 receives the content name and the playback device identifier that are transmitted in the step S315 from the time authentication unit 107. Upon receipt, the encryption unit 102 reads, from the public key storage unit 106, the public key "KP2" that corresponds to the playback device identifier "ID2". The encryption unit 102 then encrypts the content having the received content name using the public key "KP2", so that an encrypted content is generated (step S318).

The encryption unit 102 reads expiry information of the content having the received content name. The encryption unit 102 then transmits the encrypted content along with the content name and the expiry information to the playback device 12 via the communication unit 201 (step S319).

In the playback device 12, the control unit 211 receives via the communication unit 201 the encrypted content along with the content name and the expiry information. The control unit 211 then generates a content file containing the received content, content name, and expiry information and stores the generated content file into the content storage unit 206 (step S320).

The control unit 211 transmits the received expiry information to the use-permission judging unit 207 and also transmits the received content name to the decryption unit 208.

Upon receipt of the use-permission judging unit 207, the expiry information reads a time from the clock unit 203 (step S321).

The use-permission judging unit 207 compares the read time and the expiry information to judge whether use of the content is permitted (step S322).

If judging that use of the content is prohibited (step S323: NO), the use-permission judging unit 207 terminates the process. On the other hand, if judging that use of the content is permitted (step S323: YES), the use-permission judging unit 207 transmits a decryption instruction to the decryption unit 208.

Upon receipt of the decryption instruction, the decryption unit 208 reads the secret key 252 "KS2" from device information storage unit 205, decrypts the encrypted content using the secret key "KS2" (step S324), and transmits the decrypted content to the playback unit 209 (step S324).

Upon receipt of the decrypted content, the playback unit 209 generates video and audio signals from the content and transmits the video and audio signals to the display control unit 213.

The display control unit 213 outputs the received video and audio signals to the display device 15, so that the display device 15 produces video and audio output (step S325).

Modifications

Up to this point, the present invention has been described by way of the above embodiment. Yet, it is naturally appreciated that the present invention is not limited to the specific embodiment described above. Various modifications including the following fall within the scope of the present invention.

(1) The distribution device 11 may store, in memory such as a device identifier storage unit, the device identifiers of playback devices of which clock units are judged to be valid by the time authentication unit 107.

Alternatively, the distribution device 11 may initially store, in the device identifier storage unit, the device identifiers of all the playback devices included in the content playback system. If the time authentication unit 107 judges that the clock unit of a playback device is invalid, the device identifier of that playback device is deleted from the device identifier storage unit.

When receiving, from a playback device, a content request that includes a device identifier of the playback device and a content name, the distribution device 11 judges whether the device identifier matches any of the device identifiers stored in the device identifier storage unit. If the received device identifier matches any of the stored device-identifiers, the clock unit of the playback device is valid. Thus, the distribution device transmits the requested content identified by the content name.

This arrangement eliminates the need for performing the time authentication process upon receipt of a content request. For example, the time authentication process may be performed periodically, so that the transmission of contents is permitted based on the result of most-recently performed time authentication process.

Alternatively, the distribution device 11 may store, in memory such as a device identifier storage unit, device identifiers of playback devices of which clock units are judged to be invalid by the time authentication unit 107.

Alternatively, the distribution device 11 may initially store, in the device identifier storage unit, the device identifiers of all the playback devices included in the content playback system. If the time authentication unit 107 judges that the clock unit of a playback device is valid, the device identifier of that playback device is deleted from the device identifier storage unit.

When receiving, from a playback device, a content request that includes a device identifier of the playback device and a content name, the distribution device 11 judges whether the device identifier matches any of the device identifiers stored in the device identifier storage unit. If the received device identifier matches none of the stored device identifiers, the clock unit of the playback device is valid. Thus, the distribution device transmits the requested content identified by the content name.

This arrangement eliminates the need for performing the time authentication process upon receipt of a content request. For example, the time authentication process may be performed periodically, so that the transmission of contents is performed based on the result of most-recently performed time authentication process.

(2) The distribution device 11 may output a result of authentication by the time authentication unit 107 to the playback device 12. When the playback device 12 receives the authentication result via the communication unit 101, the display control unit 114 may display on the display unit 13 a message reading, for example, "the clock is invalid" to indicate that the clock unit 103 of the playback device 12 is incorrect.

It is possible that the clock unit 103 is incorrect simply because of a failure. In view of this, the display control unit 114 may display a message reading, for example, "the clock is out of order" to inform the user of the failure.

(3) According to the above-described embodiment, the time authentication unit 107 of the distribution device 11 performs the time authentication during the content playback process. Alternatively, however, the time authentication process may be performed periodically.

In this case, the control unit 115 monitors the time measured by the clock unit 103 and issuers a time request to the time request generating unit 108 at regular intervals, such as every hour, every day, every week, or every month. Execution of the time authentication process described in the above embodiment is triggered by a time request.

In addition, the distribution device 11 according to the above embodiment performs the time authentication process for authenticating the clock unit of a playback device that requests-playback of a content. Alternatively, however, it is applicable to regularly perform the time authentication process for authenticating all the playback devices included in the content playback system 1.

The time authentication results of the respective playback devices may be stored in a storage device such as the content storage unit 110.

In addition, the history of periodically performed time authentication results of each playback device may be stored in the storage device. Each playback device may be judged to be valid based on the authentication history. To be more specific, for example, each playback device may be judged, if more than a predetermined number of authentication results indicate that the clock unit is valid.

(4) Other than the examples of "predetermined timing" described above in the embodiment, the distribution device 11 may update the time-relation information stored in the time-relation information storage unit 104 using the target time and the authentication time acquired through a content playback process.

To be more specific, the distribution device 11 updates a piece of time-relation information that is stored in the time-relation information storage unit 104 and that corresponds a playback device identifier of the playback device performing the content playback process. The playback-device-time included in the piece of time-relation information is overwritten with a target time acquired through the content playback process. In addition, the distribution-device-time in the piece of time-relation information is overwritten with an authentication time acquired through the content playback process.

(5) According to the above embodiment, the time authentication unit 107 judges in the time authentication process whether the authentication difference is larger than the threshold. Alternatively, however, it is applicable to judge whether the authentication difference is larger than a predetermined first threshold and a predetermined second threshold.

To be more specific, the distribution device 11 may further include a time adjustment information generating unit for generating time adjustment information that is used to adjust the difference. In addition, the playback device further includes a clock adjustment unit for adjusting the clock unit 203. If the authentication difference is larger than the first threshold but smaller than or equal to the second threshold, the time adjustment information generating unit generates clock adjustment information used to adjust the clock unit 203 of the playback device 12, and transmits the clock adjustment information to the playback device 12. Upon receipt of the clock adjustment information, the clock adjustment unit of the playback device 12 adjusts the clock unit 203 according to the received clock adjustment information.

In addition, it is applicable that if the authentication difference is larger than the second threshold, the distribution device 11 does not distribute the requested content.

(6) According to the above embodiment, the encryption unit 102 reads the expiry information of the content identified by the content name, and transmits the content name, the encrypted content, and the expiry information to the playback device 12 via the communication unit 201. Alternatively, however, the distribution device 11 may further includes an expiry information modifying unit for modifying the expiry information. The expiry information modified by the expiry information modifying unit may be transmitted to the playback device 12.

The expiry information modifying unit modifies the expiry information based on the first and second differences.

For example, the expiry information modifying unit calculates the ratio between the first and second differences. If the ratio is "1/4", the expiry information modifying unit calculates the remaining usage period from the usage expiry indicated by the expiry information and the current time measured by the clock unit 103. The expiry information modifying unit then multiplies the remaining usage period by the ratio of 1/4. The expiry information modifying unit then modifies the expiry information to the value calculated by adding the result of the multiplication to the time measured by the clock unit.

In addition, the usage expiry may be modified depending on the communications state and the modified usage expiry is transmitted to the playback device.

To be more specific, for example, in the case where the communication path (such as a combination cable) between the distribution device 11 and the playback device 12 is of inferior quality, it takes longer for the distribution device 11 to transmit a content to the playback device 12, as compared with the case with a communication path of better quality. In view of this, the distribution device 11 may modify the expiry information to indicate a later usage expiry and transmit the modified expiry information. For making such a modification, the distribution device 11 transmits a ping packet to the playback device 12. If the distribution device 11 receives a response packet after the passage of a predetermined time period, the expiry information modifying unit modifies the usage expiry by adding the time lapsed after the passage of the predetermined time period.

More specifically, the distribution device 11 sets the predetermined time period to one second. If it takes twenty seconds for the distribution device 11 to receive a response packet since the transmission of a ping, a period of 19 seconds (=20 seconds−1 second) is added to the usage expiry and the thus modified usage expiry is transmitted to the playback device 12.

(7) According to the above embodiment, the time authentication unit 107 judges in the step S314 whether the authentication difference is smaller than the threshold. If the authentication difference is smaller than the threshold, playback restriction information indicating playback permission is transmitted to the playback device 12 via the communication unit 101. Alternatively, the time authentication unit 107 may judge whether the authentication difference is smaller than or equal to the threshold. If the authentication difference is smaller than or equal to the threshold, playback restriction information indicating playback permission to the playback device 12 via the communication unit 101.

The threshold may be a value "0".

According the above embodiment, the time authentication unit 107 performs the following in the steps S313-S315. The time authentication unit 107 calculates, using the time-relation information, the first difference, the second difference, and the authentication difference. As described in the above embodiment, the first difference is a difference between the playback-device-time and the distribution-device-time. The second difference is a difference between the distribution-device-time and the playback-device-time. The authentication difference is calculated by subtracting the second difference from the first difference. The time authentication unit 107 then judges whether the authentication difference is smaller than the threshold. If the authentication difference is smaller, the time authentication unit 107 transmits playback restriction information indicating playback permission to the playback device 12 via the communication unit 101, and also transmits a time authentication result indicating playback permission to the control unit 115. Alternatively, however, the time authentication unit 107 may judge that the clock unit of the playback device is valid if the first and second differences are equal to each other.

This modification is applicable to the case where the minimum unit of the first and second differences is longer (such as one hour, ten hours, or one day) than a relatively short unit such as one second.

In addition, the distribution device 11 stores time-relation information that includes a playback-device-time and a distribution-device-time in the time-relation information storage unit 104. Alternatively, however, it is applicable to store a storage difference that is a difference between the distribution-device-time and the playback-device-time.

In this case, the time authentication unit 107 calculates a difference between the authentication time and the target time and calculates an authentication difference by subtracting the storage difference from the thus calculated difference.

(8) According to the above embodiment, the distribution device 11 stores a content and a usage expiry of the content. Alternatively, however, it is applicable that the playback device 12 stores in advance a content and a usage expiry of the content.

In this case, upon receipt of a user operation instructing to use the content or at predetermined time intervals, the playback device 12 requests the distribution device 11 for time authentication. In response, the distribution device 11 performs the above-described time authentication process. If the clock unit of the playback device is valid, the distribution device 11 transmits, to the playback device 12, playback restriction information indicating that use of the content is permitted. On the other hand, if the clock unit of the playback device is invalid, the distribution device 11 transmits to the playback device 12 an instruction to rewrite the usage expiry, so that use of the content by the playback device 12 is prohibited.

Upon receipt of the instruction from the distribution device 11, the playback device 12 rewrites the stored usage expiry to such a usage expiry that results in prohibition of use of the content.

(9) In the distribution device 11, the encryption unit 102 transmits an encrypted content along with the content name and expiry information to the playback device 12 via the communication unit 201. Yet, the present invention is not limited to such. For example, it is applicable to transmit expiry information that indicates a usage period (six days, for example) instead of the usage expiry.

The playback device receives the encrypted content, the content name, and the expiry information indicating the usage period from the distribution device 11, and stores a content file containing the received encrypted content, content name, and expiry information into the content storage unit.

In addition, the playback device may record the reception date and time of the encrypted content into a storage device such as a content storage unit. Decryption of the encrypted content and playback of the decrypted content are permitted only within a predetermined time period from the reception date and time.

The playback device may measure and record a time period for which the content is played back and keep a cumulative total playback period. When the total playback period reaches the usage period indicated by the expiry information, the content cannot be played back any more.

(10) The time information and usage expiry are expressed in the number of seconds passed from Jan. 1, 1970. Yet, the present invention is not limited to such. For example, the time information and usage expiry may be expressed in the number of seconds passed since any other date or may be expressed in any unit other than seconds, such as minutes and hours.

(11) According to the above embodiment, the time authentication unit 107 calculates the first difference by subtracting the distribution-device-time from the authentication time and calculates the second difference by subtracting the playback-device-time from the target time. Yet, the present invention is not limited to such.

For example, the first difference may be calculated by subtracting the target time from the authentication time. The second difference may be calculated by subtracting the playback-device-time from the distribution-device-time.

(12) Physically, each of the above devices is a computer system composed, for example, of a microprocessor, ROM, RAM, hard disk unit, a display unit, a keyboard, and a mouse. The RAM or the hard disk stores a computer program and the CPU operates in accordance with the computer program, so that each device achieves its functionality. The computer program is a combination of a plurality of pieces of instruction code for instructing the computer to operate to achieve the predetermined functionality.

(13) Some or all of the modules of each device described above may be implemented in a single system LSI (Large Scale Integration circuit). The system LSI is a large scale integrated circuit composed of multiple components fabricated on a single chip. Specifically, the system LSI is a computer system composed mainly of a microprocessor, ROM, and RAM. The RAM stores a computer program. The microprocessor operates in accordance with the computer program, so that the system LSI carries out its functionality.

(14) Some or all of the modules of each device described above may be implemented in an IC card or a single module detachable from the respective device. The IC card or module is a computer system composed mainly of a microprocessor, ROM, and RAM. The IC card or module may include the large scale integrated circuit mentioned above. The RAM stores a computer program. The microprocessor operates in accordance with the computer program, so that the IC card or module carries out its functionality. In addition, the IC card or module may be made tamper-resistant.

(15) The present invention may be embodied as any of the methods described above or a computer program for causing a computer to execute such a method. Furthermore, the present invention may be embodied as a digital signal representing such a computer program.

Still further, the present invention may be embodied as a computer-readable recording medium storing the computer program or digital signal mentioned above. Examples of compute-readable recording media includes a flexible disk, hard disk, CD-ROM, MO, DVD, DVD-ROM, DVD-RAM, BD (Blu-ray Disc), and semiconductor memory. Still further, the present invention may be embodied as the computer program or digital signal per se stored on such a recording medium.

Still further, the present invention may be embodied as the computer program or digital signal that is transmitted via a telecommunication network, wireless or wired communication network, a network typified by the Internet, or data broadcasting.

Still further, the present invention may be embodied as a computer system composed of a microprocessor and memory. The memory stores the computer program mentioned above and the microprocessor operates in accordance with the computer program.

Still further, the program or digital signal mentioned above may be transferred in form of a recording medium mentioned above, or via a network mentioned above, so that the program or digital signal may be executed by another independent computer system.

(16) The present invention may be embodied as any combination of the above-described embodiments and modifications.

INDUSTRIAL APPLICABILITY

Time authentication devices according to the present invention are used as electronic devices such as digital home appliances or integrated within electronic devices. In addition, the time authentication devices are manufactured and sold by the industry relating to electronic devices. In addition, the time authentication devices are usable in the industries for content distribution.

The invention claimed is:

1. A time authentication device for authenticating a target clock included in a target device, the time authentication device comprising:
   a clock unit operable to measure a time;
   a storage unit operable to store a first time and a second time, the first time being measured by the target device and acquired from the target device in response to a first request to the target device to send a time, and the second time being measured by the clock unit relatively to the first request;
   an acquiring unit operable to acquire a third time and a fourth time, the third time being measured by the target device and acquired from the target device in response to a second request to the target device to send a time, and the fourth time being measured by the clock unit relatively to the second request;
   a judging unit operable to judge, based on the first time, the second time, the third time, and the fourth time, whether a difference between a time measured by the target clock and a time measured by the clock unit falls within a permissible range; and
   an output unit operable to output an authentication result indicating that the target clock is valid if the difference is judged to fall within the permissible range, and indicating that the target clock is invalid if the difference is judged to fall outside the permissible range.

2. The time authentication device according to claim 1, wherein
   the judging unit is operable to judge whether a third difference is smaller than or equal to a threshold, the third difference being a difference between (a) a first difference between the fourth time and the second time and (b) a second difference between the third time and the first time, and
   the output unit is operable to output an authentication result indicating that the target clock is valid if the third difference is judged to be smaller than or equal to the threshold and thus falls within the permissible range, and that the target clock is invalid if the third difference is judged to be larger than the threshold and thus falls outside the permissible range.

3. The time authentication device according to claim 1, wherein
   the judging unit is operable to judge whether a third difference is smaller than or equal to a threshold, the third difference being a difference between (a) a first difference between the fourth time and the third time and (b) a second difference between the second time and the first time, and
   the output unit is operable to output an authentication result indicating that the target clock is valid if the third difference is judged to be smaller than or equal to the threshold and thus falls within the permissible range, and that the target clock is invalid if the third difference is judged to be larger than the threshold and thus falls outside the permissible range.

4. The time authentication device according to claim 1, wherein
   the storage unit is operable to store, as the second time, a time measured by the clock unit when the first time is acquired, and
   the acquiring unit is operable to acquire, as the fourth time, a time measured by the clock unit when the third time is acquired.

5. The time authentication device according to claim 1, wherein
   the storage unit is operable to store, as the second time, a time measured by the clock unit when a request for sending the first time is issued to the target device, and
   the acquiring unit is operable to acquire, as the fourth time, a time measured by the clock unit when a request for sending the third time is issued to the target device.

6. The time authentication device according to claim 2, wherein
   the threshold is "0", and
   the judging unit is operable to calculate the third difference by subtracting the second difference from the first difference and to judge whether the third difference is smaller than or equal to "0".

7. The time authentication device according to claim 2, wherein
   the threshold is a value calculated by multiplying the first difference by a predetermined ratio, and the judging unit is operable to judge whether the third difference is smaller than or equal to the value calculated by multiplying the first difference by the predetermined ratio.

8. The time authentication device according to claim 1, wherein the acquiring unit is operable to acquire, as the third time, a time measured when the target device requests to start playback of the content.

9. A time authentication method for use by a time authentication device for authenticating a target clock included in a target device, the time authentication device including a clock unit operable to measure a time, and a storage unit operable to store measured times, the method comprising:

storing a first time and a second time, the first time being measured by the target device and acquired from the target device in response to a first request to the target device to send a time, and the second time being measured by the clock unit relatively to the first request;

acquiring a third time and a fourth time, the third time being measured by the target device and acquired from the target device in response to a second request to the target device to send a time, and the fourth time being measured by the clock unit relatively to the second request;

fudging, based on the first time, the second time, the third time, and the fourth time, whether a difference between a time measured by the target clock and a time measured by the clock unit falls within a permissible range; and outputting an authentication result indicating that the target clock is valid if the difference is judged to fall within the permissible range, and indicating that the target clock is invalid if the difference is judged to fall outside the permissible range.

10. A non-transitory computer-readable recording medium storing a computer program for use by a time authentication device for authenticating a target clock that measures a time and that is included in a target device, the time authentication device including a clock unit operable to measure a time, and a storage unit operable to store measured times, the computer program causing the time authentication device to perform steps comprising:

storing a first time and a second time, the first time being measured by the target device and acquired from the target device in response to a first request to the target device to send a time, and the second time being measured by the clock unit relatively to the first request;

acquiring a third time and a fourth time, the third time being measured by the target device and acquired from the target device in response to a second request to the target device to send a time, and the fourth time being measured by the clock unit relatively to the second request;

fudging, based on the first time, the second time, the third time, and fourth time, whether a difference between a time measured by the target clock and a time measured by the clock unit falls within a permissible range; and outputting an authentication result indicating that the target clock is valid if the difference is judged to fall within the permissible range, and indicating that the target clock is invalid if the difference is judged to fall outside the permissible range.

11. An integrated circuit for use by a time authentication device for authenticating a target clock included in a target device, the integrated circuit comprising:

a clock unit operable to measure a time;

a storage unit operable to store a first time and a second time, the first time being measured by the target device and acquired from the target device in response to a first request to the target device to send a time, and the second time being measured by the clock unit relatively to the first request;

an acquiring unit operable to acquire a third time and a fourth time, the third time being measured by the target device and acquired from the target device in response to a second request to the target device to send a time, and the fourth time being measured by the clock unit relatively to the second request;

a judging unit operable to judge, based on the first time, the second time, the third time, and fourth time, whether a difference between a time measured by the target clock and a time measured by the clock unit falls within a permissible range; and an output unit operable to output an authentication result indicating that the target clock is valid if the difference is judged to fall within the permissible range, and indicating that the target clock is invalid if the difference is judged to fall outside the permissible range.

12. A time authentication system comprising:

a target device having a target clock operable to measure a time; and a time authentication device for authenticating the time measured by the target clock, wherein the time authentication device includes (i) a clock unit operable to a measure time, (ii) a storage unit operable to store a first time and a second time, the first time being measured by the target device and acquired from the target device in response to a first request to the target device to send a time, and the second time being measured by the clock unit relatively to the first request, (iii) an acquiring unit operable to acquire a third time and a fourth time, the third time being measured by the target device and acquired from the target device in response to a second request to the target device to send a time, and the fourth time being measured by the clock unit relatively to the second request, (iv) a judging unit operable to judge, based on the first time to the fourth time, whether a difference between a time measured by the target clock and a time measured by the clock unit falls within a permissible range, and (v) an output unit operable to output an authentication result indicating that the target clock is valid if the difference is judged to fall within the permissible range, and indicating that the target clock is invalid if the difference is judged to fall outside the permissible range.

13. The time authentication system according to claim 12, wherein the target device is operable to receive from the time authentication device a request for sending a time, and sends to the time authentication device a time that is measured by the target clock when the request is received, and the acquiring unit includes:

a monitoring subunit operable to monitor the time measured by the clock unit;

a request subunit operable to issue to the target device a request for sending a time when the time measured by the clock unit reaches a time that is a predetermined time period after the second time;

a response acquiring subunit operable to acquire the third time sent from the target device in response to the time send request; and a time acquiring subunit operable to acquire, as the fourth time, a time measured by the clock unit when the third time is acquired.

14. The time authentication system according to claim 12, wherein the target device is operable to use a content on or before a usage expiry of the content based on the target clock, the time authentication device further comprising:

a content storage unit operable to store a content having a usage expiry; and a sending unit operable to send the content and the usage expiry to the target device if the authentication result indicates that the target clock is valid.

15. The time authentication system according to claim 12, wherein the target device is operable to use a content on or before a usage expiry of the content based on the target clock, the time authentication device further comprising:

a content storage unit operable to store a content having a usage expiry;

a sending unit operable to send the content and an expiry to the target device if the authentication result indicates that the target clock is valid;

the expiry is calculated by subtracting a third difference from the usage expiry; and the third difference is a difference between (a) a first difference between the fourth time and the second time and (b) a second difference between the third time and the first time.

16. The time authentication system according to claim 12, the target device is operable to use a content on or before a usage expiry of the content based on the target clock, the time authentication device further comprising:

a content storage unit operable to store a content having a usage expiry;

a sending unit operable to send the content and an expiry to the target device if the authentication result indicates that the target clock is valid; and the expiry is calculated by the following expression:

the fourth time+(the usage expiry−the fourth time)×(a first difference/a second difference), wherein the first difference is a difference between the fourth time and the second time, and wherein the second difference is a difference between the third time and the first time.

17. The time authentication system of claim 12, wherein the target device is operable to store a content and a usage expiry of the content, and to use the content if a current time measured by the target clock is on or before the usage expiry, the time authentication device further comprising:

an instruction unit operable to instruct the target device to rewrite the usage expiry so that use of the content is no longer permitted when the authentication result indicates that the target clock is invalid.

18. The method according to claim 9, wherein the second time is a time measured by the clock unit when the first request is issued to the target device, the fourth time is a time measured by the clock unit when the second request is issued to the target device.

19. The method according to claim 18, wherein said judging operation includes judging whether a third difference is smaller than or equal to a threshold, the third difference being a difference between (a) a first difference between the fourth time and the second time and (b) a second difference between the third time and the first time, and said outputting operation includes outputting an authentication result which indicates that the target clock is valid if the third difference is judged to be smaller than or equal to the threshold and thus falls within the permissible range, and which indicates that the target clock is invalid if the third difference is judged to be larger than the threshold and thus falls outside the permissible range.

20. The method according to claim 18, wherein said judging operation includes judging whether a third difference is smaller than or equal to a threshold, the third difference being a difference between (a) a first difference between the fourth time and the third time and (b) a second difference between the second time and the first time, and said outputting operation includes outputting an authentication result which indicates that the target clock is valid if the third difference is judged to be smaller than or equal to the threshold and thus falls within the permissible range, and which indicates that the target clock is invalid if the third difference is judged to be larger than the threshold and thus falls outside the permissible range.

* * * * *